US010764570B2

(12) United States Patent
Hong et al.

(10) Patent No.: US 10,764,570 B2
(45) Date of Patent: Sep. 1, 2020

(54) ROTATING INSPECTOR FOR CAMERA MODULE

(71) Applicant: ISMEDIA Co., Ltd., Anyang-si (KR)

(72) Inventors: Seong Cheol Hong, Yongin-si (KR); Dong Choon Kim, Daejeon (KR); Sung Oh Yim, Gwangmyeong-si (KR); Yong Woo Han, Yongin-si (KR); Eun Seok Shin, Gunpo-si (KR); Cheon Su Mun, Incheon (KR); Min Seog Choi, Bucheon-si (KR)

(73) Assignee: ISMedia Co., Ltd., Anyang-si (KR)

( * ) Notice: Subject to any disclaimer, the term of this patent is extended or adjusted under 35 U.S.C. 154(b) by 70 days.

(21) Appl. No.: 16/252,638

(22) Filed: Jan. 20, 2019

(65) Prior Publication Data

US 2019/0313088 A1  Oct. 10, 2019

(30) Foreign Application Priority Data

Apr. 6, 2018 (KR) .................. 10-2018-0040339

(51) Int. Cl.
*H04N 17/00* (2006.01)
*H04N 5/225* (2006.01)

(52) U.S. Cl.
CPC ......... *H04N 17/002* (2013.01); *H04N 5/2253* (2013.01)

(58) Field of Classification Search
CPC ...... H04N 17/002; H04N 5/2253–2256; H01L 21/67259; H01L 21/67288;
(Continued)

(56) References Cited

U.S. PATENT DOCUMENTS 7,102,743 B2 * 9/2006 Tsuji ................. G01N 21/9503
356/237.2
9,541,600 B2 * 1/2017 Scheibenzuber .. G01R 31/2867
(Continued)

FOREIGN PATENT DOCUMENTS

| CN | 106060532 | 10/2016 |
| CN | 107205148 | 9/2017 |

(Continued)

*Primary Examiner* — Michael S Osinski

(57) ABSTRACT

The present invention relates to a rotating inspector for a camera module. The rotating inspector includes a rotary table having one or more socket units on which the camera module mounted; a plurality of inspection devices disposed around the rotary table to inspect the camera module; test boards disposed on the rotary table, each of test boards being connected to the one or more socket units, respectively to control the camera module and generate inspection data for the camera module; a first data processing unit disposed on the rotary table and analyzing the inspection data to generate result data for possible defects of the camera module; a second data processing unit disposed outside the rotary table, the second data processing unit being configured to receive the result data and to sort and store the received data; and a data transmission unit transmitting the result data generated in the first data processing unit to the second data processing unit. Accordingly, the inspection result obtained from the respective inspection devices disposed around the rotary table can be stably transmitted.

10 Claims, 7 Drawing Sheets

(58) Field of Classification Search
CPC ............. H01L 21/67144; H01L 21/681; H01L
21/02065; H01L 21/67051; H01L
21/67132; H01L 21/67265; H01L
21/67706; H01L 21/67721; H01L
21/67742; H01L 21/67748; H05K
13/0417; H05K 13/0413; H05K 13/0813;
H05K 13/0061; H05K 13/022; H05K
13/0406; H05K 13/081; H05K 13/0812;
H05K 13/0815; H05K 13/083; G06K
9/4604; G01N 21/88; G01N 21/95; G01N
21/9501; G01N 21/9503
See application file for complete search history.

(56) References Cited

U.S. PATENT DOCUMENTS

| | | | | |
|---|---|---|---|---|
| 10,269,105 | B2* | 4/2019 | Chang | G06T 7/337 |
| 10,347,514 | B2* | 7/2019 | Koch | H05K 13/0813 |
| 10,638,650 | B2* | 4/2020 | Hirakawa | H05K 13/021 |
| 2004/0261930 | A1* | 12/2004 | Ogimoto | G02F 1/1333 |
| | | | | 156/64 |
| 2005/0016818 | A1* | 1/2005 | Ito | B05B 13/0228 |
| | | | | 198/345.1 |
| 2006/0087330 | A1* | 4/2006 | Saito | G01R 31/307 |
| | | | | 324/754.03 |
| 2011/0129125 | A1* | 6/2011 | Kim | G06T 5/006 |
| | | | | 382/115 |
| 2011/0248190 | A1* | 10/2011 | Tanaka | H01L 21/67259 |
| | | | | 250/492.21 |
| 2013/0283594 | A1* | 10/2013 | Iwaki | B23P 11/00 |
| | | | | 29/428 |
| 2015/0097944 | A1* | 4/2015 | Palm | G06T 7/0008 |
| | | | | 348/129 |
| 2015/0253258 | A1* | 9/2015 | Shimada | H01L 21/67288 |
| | | | | 414/226.05 |
| 2016/0205330 | A1* | 7/2016 | Rojahn | H04N 9/07 |
| | | | | 348/143 |
| 2016/0210524 | A1* | 7/2016 | Hasegawa | G01N 21/85 |
| 2016/0219761 | A1* | 7/2016 | Nishiyama | H05K 13/0404 |
| 2016/0329229 | A1* | 11/2016 | Sun | H01L 21/68764 |
| 2017/0132784 | A1* | 5/2017 | Yamada | G06T 7/74 |
| 2018/0006543 | A1* | 1/2018 | Kawaguchi | H05K 13/0406 |
| 2018/0061041 | A1* | 3/2018 | Ahn | G06T 7/0004 |
| 2018/0177087 | A1* | 6/2018 | Kito | H05K 13/0813 |
| 2018/0192522 | A1* | 7/2018 | Taniguchi | H05K 13/0417 |
| 2019/0346374 | A1* | 11/2019 | Bonardi | H04N 5/2256 |
| 2020/0116570 | A1* | 4/2020 | Ahn | B08B 1/001 |
| 2020/0128157 | A1* | 4/2020 | Ochi | G03B 5/00 |
| 2020/0141973 | A1* | 5/2020 | Hong | G01R 31/2836 |
| 2020/0151490 | A1* | 5/2020 | Iwami | G06T 7/13 |
| 2020/0152491 | A1* | 5/2020 | Koch | H01L 21/681 |
| 2020/0167946 | A1* | 5/2020 | Kwon | G06T 7/64 |

FOREIGN PATENT DOCUMENTS

| | | |
|---|---|---|
| KR | 10-2014-0028736 | 3/2014 |
| KR | 10-1419683 | 7/2014 |
| KR | 10-1423571 | 7/2014 |
| KR | 10-1450684 | 10/2014 |
| KR | 10-2016-0019763 | 2/2016 |

* cited by examiner

ROTATING INSPECTOR FOR CAMERA MODULE

RELATED APPLICATION

This application claims the benefit of priority of Korean Patent Application No. 10-2018-0040339 filed on Apr. 6, 2018 the contents of which are incorporated herein by reference in their entirety.

FIELD AND BACKGROUND OF THE INVENTION

The present invention relates to a rotating inspector for a camera module, and more particularly, to a rotating inspector for a camera module, which is capable of stably transmitting inspection results obtained from various inspection devices disposed around a rotary table.

Smartphones, tablet PCs or notebook computers, which have recently become widespread, generally have a built-in camera module.

In fabricating a camera module, various components of the camera module are assembled and defect inspection of the assembled camera module is then performed. The inspection of possible defects is performed in a variety of manners, including inspection of short range resolution, inspection of long range resolution, dark room checkup, inspection of driving means, or inspection of image defects.

Thus, various types of inspection devices are disposed around a rotatable table, a camera module to be inspected is mounted on the table and the table is then rotated for inspecting the camera module by means of the inspection devices. Inspection data for the camera module is transmitted to an external device via a cable passing through a rotation axis of the table, for example, a computer.

Since the inspection data includes a number of image data whose volume is large, the volume of the inspection data is large and thus, an optical cable enabling rapid data transmission or a multitude of ordinary cables, such as LAN cables, may be used to transmit the inspection data.

However, the optical cable is expensive, and managing the multitude of ordinary cables is cumbersome and the cables are liable to be twisted as the table is rotated.

LIST OF PRIOR ART

Patent Document 1: Korean Patent Application KR 10-1419683 B1

SUMMARY OF THE INVENTION

Embodiments of the present invention provide a rotating inspector for a camera module, which can easily maintain and manage means for transmitting inspection data for the camera module on a rotary table to an external device installed outside the table and can rapidly transmit the inspection data to the outside of the table.

According to an aspect of the present invention, the above and other objects can be accomplished by providing a rotating inspector for a camera module, the rotating inspector comprising: a rotary table having one or more socket units on which the camera module mounted; a plurality of inspection devices disposed around the rotary table to inspect the camera module; test boards disposed on the rotary table, each of test boards being connected to the one or more socket units, respectively to control the camera module and generate inspection data for the camera module; a first data processing unit disposed on the rotary table and analyzing the inspection data to generate result data for possible defects of the camera module; a second data processing unit disposed outside the rotary table, the second data processing unit being configured to receive the result data and to sort and store the received data; and a data transmission unit transmitting the result data generated in the first data processing unit to the second data processing unit.

The data transmission unit may include a cable for connecting the first data processing unit and the second data processing unit. In this case, the rotary table is preferably configured to be rotated by a predetermined angle and then to be reversely rotated.

The data transmission unit may include a signal converter disposed on the rotary table and converting the result data into an optical signal; a transmitter disposed on the rotary table and transmitting the result data in the form of the optical signal along a centerline of the rotary table; and a receiver disposed outside the rotary table and receiving the result data in the form of the optical signal transmitted from the transmitter.

The data transmission unit may include a near field wireless communication device disposed on the rotary table.

The data transmission unit may include a slip ring disposed on the rotary table and a brush disposed outside the rotary table and being contact with the slip ring.

The rotating inspector may further include a pneumatic supply unit supplying a pneumatic pressure for driving the socket units outside the rotary table. Here, the pneumatic supply unit preferably includes a pneumatic slip ring positioned on the centerline of the rotary table.

The first data processing units may be provided for each of the test boards, and the first data processing units may be connected to a network hub through which the first data processing units are connected to the data transmission unit.

As described above, the rotating inspector according to the present invention includes the first data processing unit disposed on the rotary table to process inspection data and to then generate result data with a reduced data size to then transmit the result data having the reduced size to the outside of the rotary table, thereby rapidly transmitting the result data to a second computer disposed at the outside of the rotary table.

Since the result data is rapidly transmitted via a single cable, it is possible to suppress the cable of the data transmission unit from being twisted, thereby easily maintaining and managing the data transmission unit.

In addition, since the rotating inspector according to the present invention includes a first data processing unit provided for each of the test boards, a time required for analyzing the inspection data can be reduced.

When the data transmission unit transmits the result data converted into an optical signal form or transmits the inspection data based on near field wireless communication, it is possible to prevent the data transmission unit from being damaged due to repeated rotations of the rotary table.

BRIEF DESCRIPTION OF THE SEVERAL VIEWS OF THE DRAWINGS

The above and other features and advantages of the present invention will become more apparent by describing in detail preferred embodiments thereof with reference to the attached drawings in which.

DESCRIPTION OF SPECIFIC EMBODIMENTS OF THE INVENTION

Hereinafter, an exemplary of the present invention will be described in detail.

Figure 1:
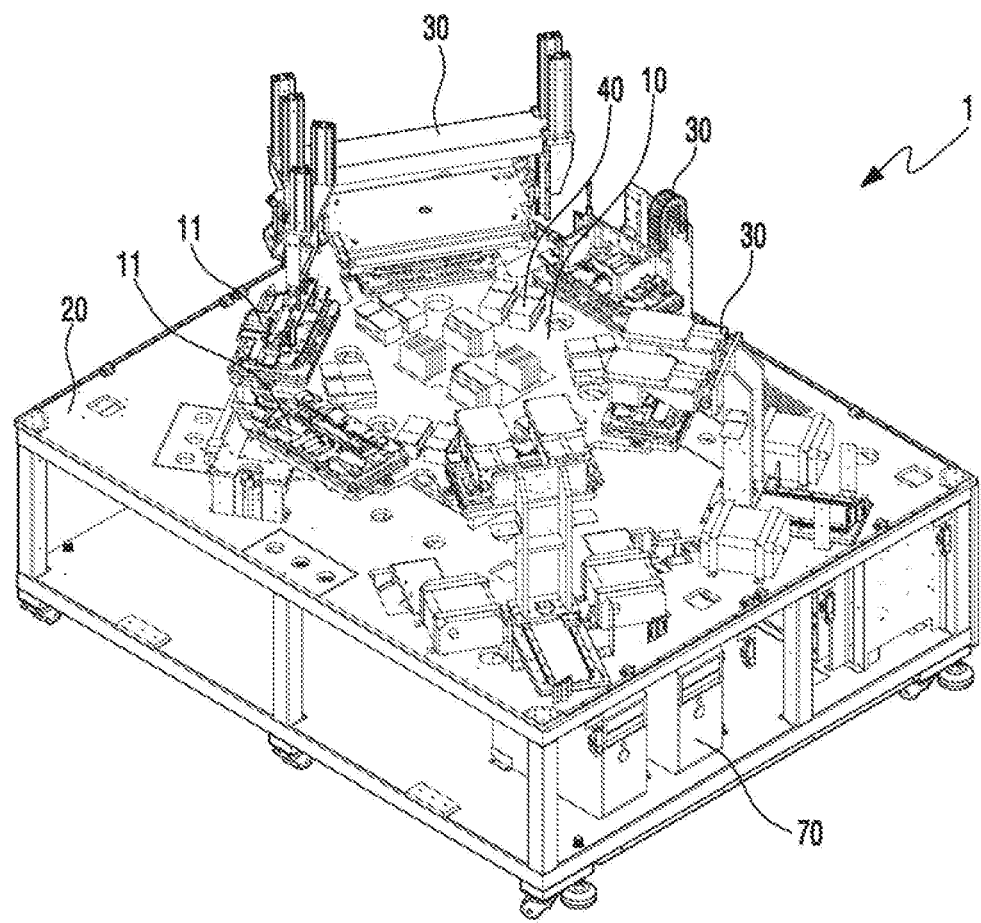
FIG. 1 is a perspective view of a rotating inspector for a camera module according to the present invention.
Figure 2:
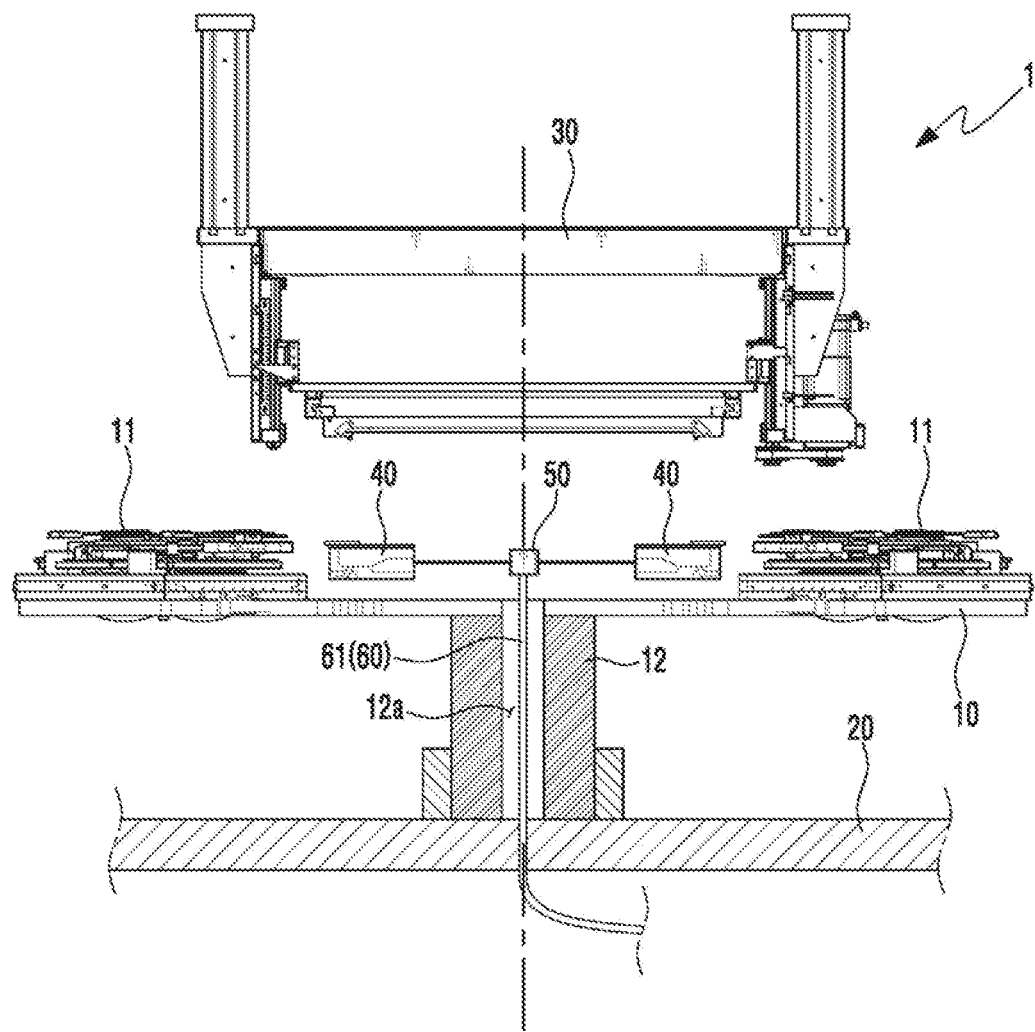
FIG. 2 is a cross-sectional view illustrating a first embodiment of the rotating inspector for a camera module according to the present invention.

A perspective view of a rotating inspector 1 of a camera module according to the present invention is illustrated in FIG. 1, and a cross-sectional view illustrating a first embodiment of the rotating inspector 1 according to the present invention is illustrated in FIG. 2.

The rotating inspector 1 according to the present invention may include a rotary table 10, a plurality of inspection devices 30, test boards 40, a first data processing unit 50, a second data processing unit 70 and a data transmission unit 60.

The rotary table 10 is a rotatable part rotating in a state in which the camera module is mounted thereon to be inspected, and includes a socket unit 11 and a rotation axis member 12.

The socket unit 11 is formed on a top surface of a flat plate of the rotary table 10 and the camera module is mounted on the socket unit. The socket unit 11 may include one or more socket units, preferably a plurality of socket units, formed on edge parts of the rotary table 10 to be spaced a predetermined distance, preferably an equal distance, apart from each other. The rotation axis member 12 may be vertically formed on a bottom portion of the center of the plate of the rotary table 10. The rotary table 10 may be rotated using a motor, a hydraulic pressure or a pneumatic pressure.

The rotary table 10 may be supported by a support unit 20 fixedly positioned under the rotary table 10 and may then be rotated at a predetermined position.

The plurality of inspection devices 30 are disposed to be spaced apart from each other around the rotary table 10 and sequentially inspect the camera module rotating with the rotary table 10 according to the rotation of the rotary table 10.

The test boards 40 are connected to the socket unit 11 in a state in which they are fixed to the top surface of the rotary table 10. When the socket unit 11 includes a plurality of socket units, the test boards 40 may be in one-to-one correspondence with the plurality of socket units 11. The test boards 40 connected to the socket units 11 are electrically connected to the camera module mounted on the socket units 11 to control the camera module. That is to say, the camera module is inspected while being checked whether it is properly actuated under various conditions, like in a case in which the camera module is actually mounted on a smartphone to then be used. Therefore, in order to inspect the camera module, the camera module should be first actuated. In this case, the test boards 40 serve to actuate the camera module. In addition, the test boards 40 may generate inspection data when the camera module is actuated for inspection, the inspection data including, for example, a photographed image of a short-distance object, a photographed image of a long-distance object, an image photographed in a dark room, a photographed image of a white background, height values of the camera module depending on actuation of driving means, electrical resistance values of the camera module, and so on.

The first data processing unit 50 is fixed to the top surface of the rotary table 10 and analyzes inspection data generated from the test boards 40 to then produce result data as to presence or absence of defects of the camera module. As described above, the inspection data contains multiple pieces of image data, making the inspection data have a very large size. Thus, the inspection data is first analyzed and the result data is then produced, thereby significantly reducing the size of the result data.

The first data processing unit 50 may be, for example, a general computer. Transmission of the inspection data from the test boards 40 to the first data processing unit 50 is preferably performed via an optical cable enabling rapid data transmission.

The data transmission unit 60 transmits the result data between the first data processing unit 50 fixed to the rotary table 10 and the second data processing unit 70 installed outside the rotary table 10. The second data processing unit 70 is fixed to the support unit 20 and receives the result data from the data transmission unit 60 to then analyze the received result data and store the analyzed data therein. In addition, the second data processing unit 70 may control the overall operation of the inspector according to the present invention. Preferably, the second data processing unit 70 includes a display device to allow an operator to easily identify the result data. Like the first data processing unit 50, the second data processing unit 70 may also be a general computer.

In the rotating inspector according to the present invention, the first data processing unit 50 analyzes the large inspection data and determines whether there are defects in the camera module to then generate small result data. The result data having a reduced size is transmitted to the second data processing unit 70 by the data transmission unit 60. Therefore, the data transmission unit 60 can rapidly transmit the result data to the second data processing unit 70. In addition, since a transmission load of the data transmission unit 60 is not so high, transmission errors of the result data are less likely to be generated in transmitting the result data.

Preferably, the first data processing unit 50 includes an image processor (not shown) for processing image data contained in the inspection data.

As described above, since the inspection data generated from the test boards 40 mostly contains image-form data having a very large size, it is not easy for the first data processing unit 50 to directly analyze the image data. Therefore, the image data is processed by the image processor and the size thereof is significantly reduced, thereby facilitating analysis of the inspection data.

The processing of the image data can be achieved by, for example, converting a white background image photographed to examine whether there is a foreign material on a lens of the camera module into a black-and-white image having a resolution to discern any foreign material from the photographed image.

A hollow 12a is formed at the center of the rotation axis member 12. Here, as illustrated in FIG. 2, the data transmission unit 60 may include a cable 61 connecting the first data processing unit 50 and the second data processing unit 70 via the hollow 12a.

A signal line, such as a general LAN cable, may be used as the cable 61. Although the rate of data transmission using the LAN cable is not so high, the result data transmitted via the LAN cable does not have a large volume, so that a long time is not required for transmitting the result data. In addition, since the result data is rapidly transmitted using only one single cable 61, the cable 61 can be easily maintained and managed.

In addition, since the cable 61, such as a LAN cable, is cheap and is easily manageable, costs and efforts required for maintenance and management of the camera module can be reduced.

In a case where the data transmission unit 60 includes the cable 61, the rotary table 10 is rotated by a predetermined angle and then is reversely rotated, thereby preventing the cable 61 connecting a rotating part and a fixed part from being damaged due to twisting of the cable 61.

The cable 61 existing in form of an optical cable, rather than in form of a LAN cable, is capable of rapidly transmitting the result data.

Figure 3:
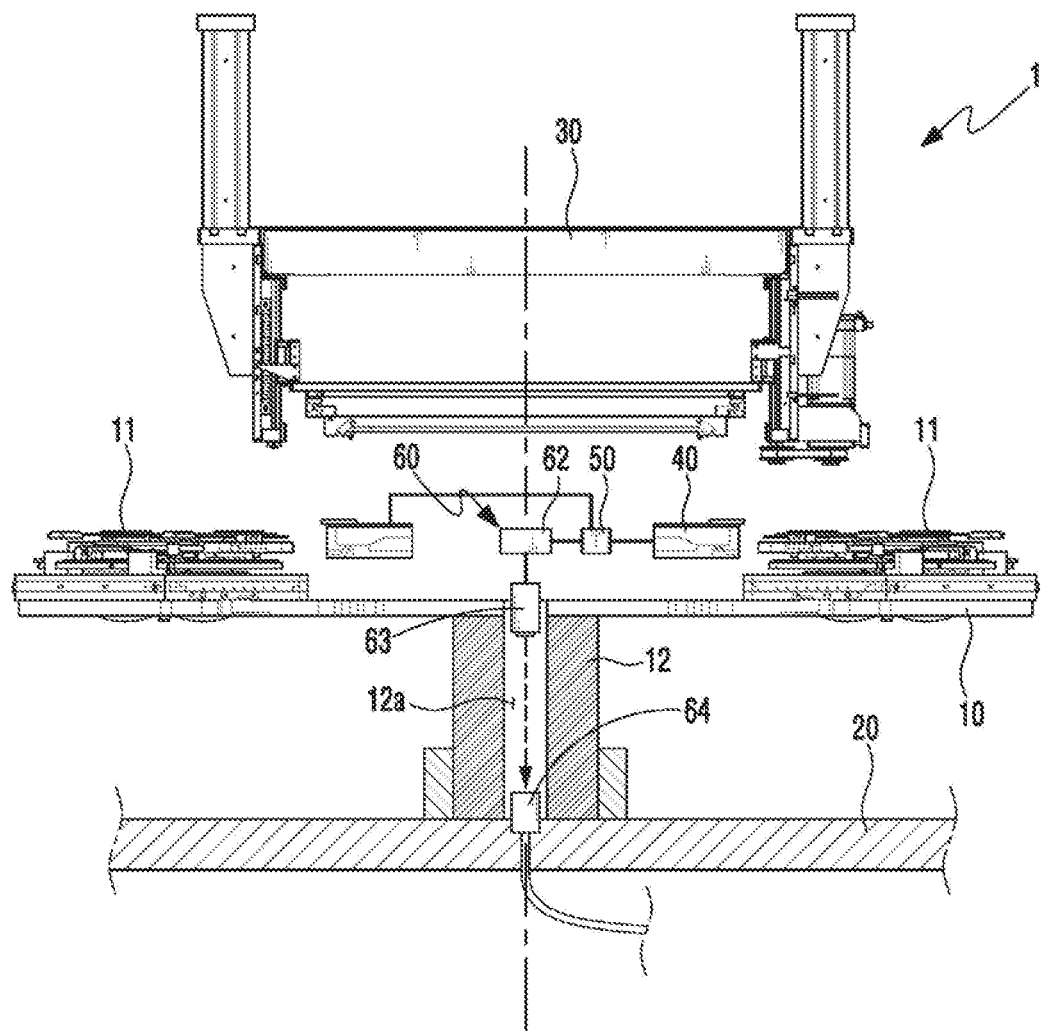
FIG. 3 is a cross-sectional view illustrating a second embodiment of the rotating inspector for a camera module according to the present invention.

The data transmission unit 60 may include a signal converter 62, a transmitter 63 and a receiver 64. A cross-sectional view illustrating a second embodiment of the rotating inspector for a camera module according to the present invention, to which the data transmission unit 60 is employed, is illustrated in FIG. 3. In the rotating inspector for a camera module according to the second embodiment of the present invention, a hollow 12a is formed at the center of the rotation axis member 12.

The signal converter 62 is fixed to a top surface of the rotary table 10 and converts the result data in an electronic form generated in the first data processing unit 50 into an optical signal form. The transmitter 63 transmits the result data in the optical signal form, which is converted from the signal converter 62, from the rotary table 10, and the receiver 64 receives the result data in the optical signal form from the fixed support unit 20.

Since the hollow 12a is formed in the rotation axis member 12 of the rotary table 10, when the transmitter 63 transmits the optical signal form data from one end of the hollow 12a, the receiver 64 may receive the optical signal form data at the other end of the hollow 12a.

A signal converter is necessarily disposed between the second data processing unit 70 and the receiver 64 to convert the optical signal form data received by the receiver 64 into an electronic form.

Since the data transmission unit 60 transmits data in an optical signal form, it can transmit the result data at a very high transmission speed. In addition, since the data transmission unit 60 optically transmits the result data without using a separate physical structure, e.g., a cable, connected between the rotary table 10 and the fixed support unit 20, there is no concern about damages of the data transmission unit 60 due to rotation of the rotary table 10. Since this effect holds true even when the rotary table 10 is continuously rotated in any one direction, it is not necessary to reverse a rotation direction of the rotary table 10 after rotating the rotary table 10 by a predetermined angle, thereby increasing the inspection efficiency of the camera module.

In addition, since the optical signal is transmitted through the hollow 12a formed at the center of the rotation axis member 12 of the rotary table 10, positions of the transmitter 63 and the receiver 64 are not changed even by rotation of the rotary table 10, thereby constantly transmitting the result data.

Figure 4:
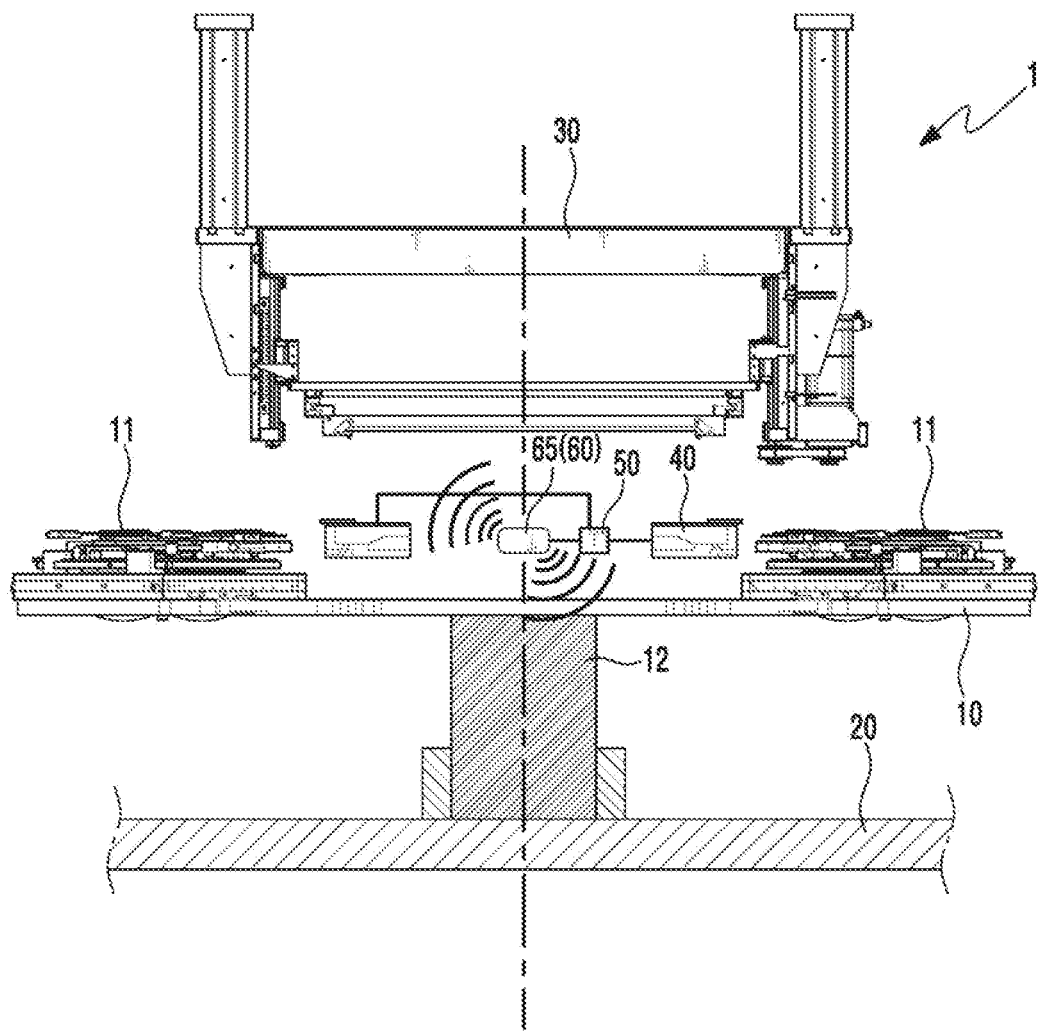
FIG. 4 is a cross-sectional view illustrating a third embodiment of the rotating inspector for a camera module according to the present invention.

The data transmission unit 60 may include a near field wireless communication device 65 fixed to the rotary table 10. A cross-sectional view illustrating a third embodiment of the rotating inspector for a camera module according to the present invention, to which the near field wireless communication device 65 is employed, is illustrated in FIG. 4.

Since the near field wireless communication device 65 is capable of transmitting the result data using electromagnetic waves without using a separate cable, there is no concern about damages of the data transmission unit 60 due to rotation of the rotary table 10, like the data transmission unit 60 including the signal converter 62, and there is no need for forming such a hollow 12a in the rotation axis member 12.

Data transmission based on the near field wireless communication device 65 is slower than that based on a wired communication device. However, since the result data generated in the first data processing unit 50 has a small size, it can be rapidly transmitted by the near field wireless communication device 65.

Wi-Fi communication or Bluetooth communication may be applied to the near field wireless communication device 65.

Figure 5:
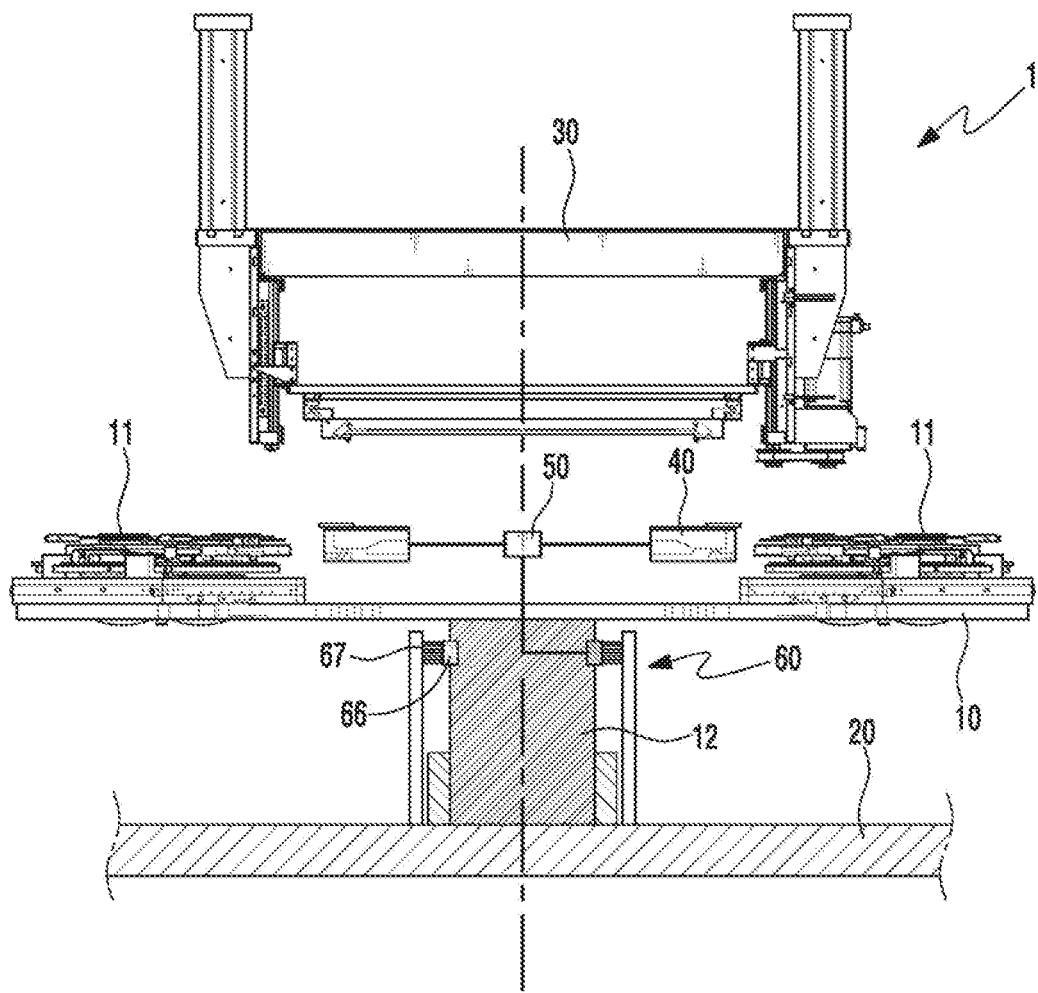
FIG. 5 is a cross-sectional view illustrating a fourth embodiment of the rotating inspector for a camera module according to the present invention.

The data transmission unit 60 includes a slip ring 66 and a brush 67. A cross-sectional view illustrating a fourth embodiment of the rotating inspector for a camera module according to the present invention is illustrated in FIG. 5.

The slip ring 66 is formed along the circumference of the rotation axis member 12 of the rotary table 10 to rotate together with the rotary table 10. The brush 67 makes contact with the slip ring 66 in a state in which it is fixed to the support unit 20. That is to say, the brush 67 is maintained at a state in which it contacts the slip ring 66 while continuously rubbing against the outer surface of the rotating slip ring 66, thereby receiving the result data.

Since the brush 67 and the slip ring 66 are configured to contact each other and are constantly in contact with each other even when the rotary table 10 is continuously rotated in any one direction, it is not necessary to reverse a rotation direction of the rotary table 10 after rotating the rotary table 10 by a predetermined angle, thereby increasing the inspection efficiency of the camera module.

Figure 6:
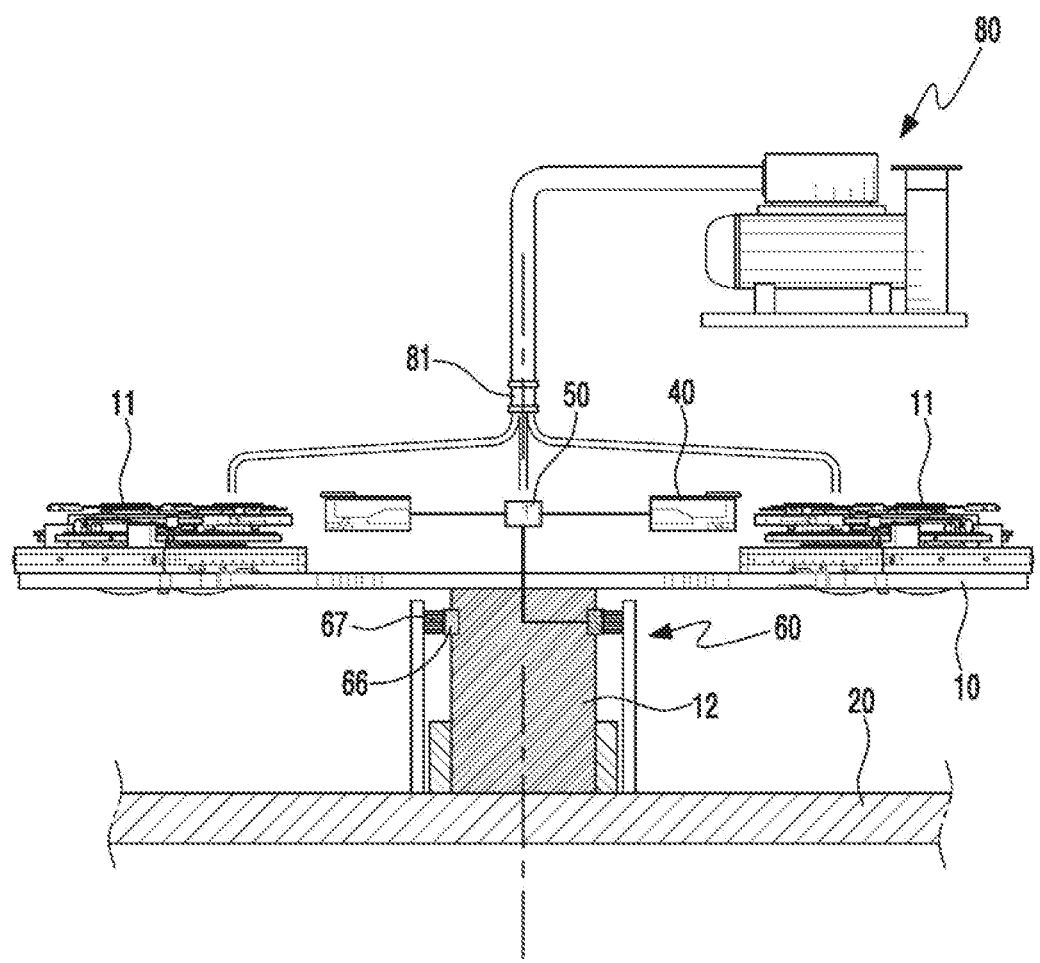
FIG. 6 is a detailed diagram of a pneumatic supply unit of the rotating inspector for a camera module according to the present invention.

When the data transmission unit 60 transmits the result data through an optical signal or a radio signal or through the brush 67 and the slip ring 66, a pneumatic supply unit 80 supplying a pneumatic pressure for driving the socket unit 11 outside the rotary table 10 may be connected to the socket unit 11 through a pneumatic slip ring 81, which is illustrated in FIG. 6.

The pneumatic slip ring 81 is a component configured to transmit the pneumatic pressure between a rotating part and a fixed part without being drained, and is disposed at the centerline of the rotary table 10. Accordingly, even when the rotary table 10 is continuously rotated in one direction, there is no concern about damages of the data transmission unit 60 due to twisting of pneumatic supply lines.

Figure 7:
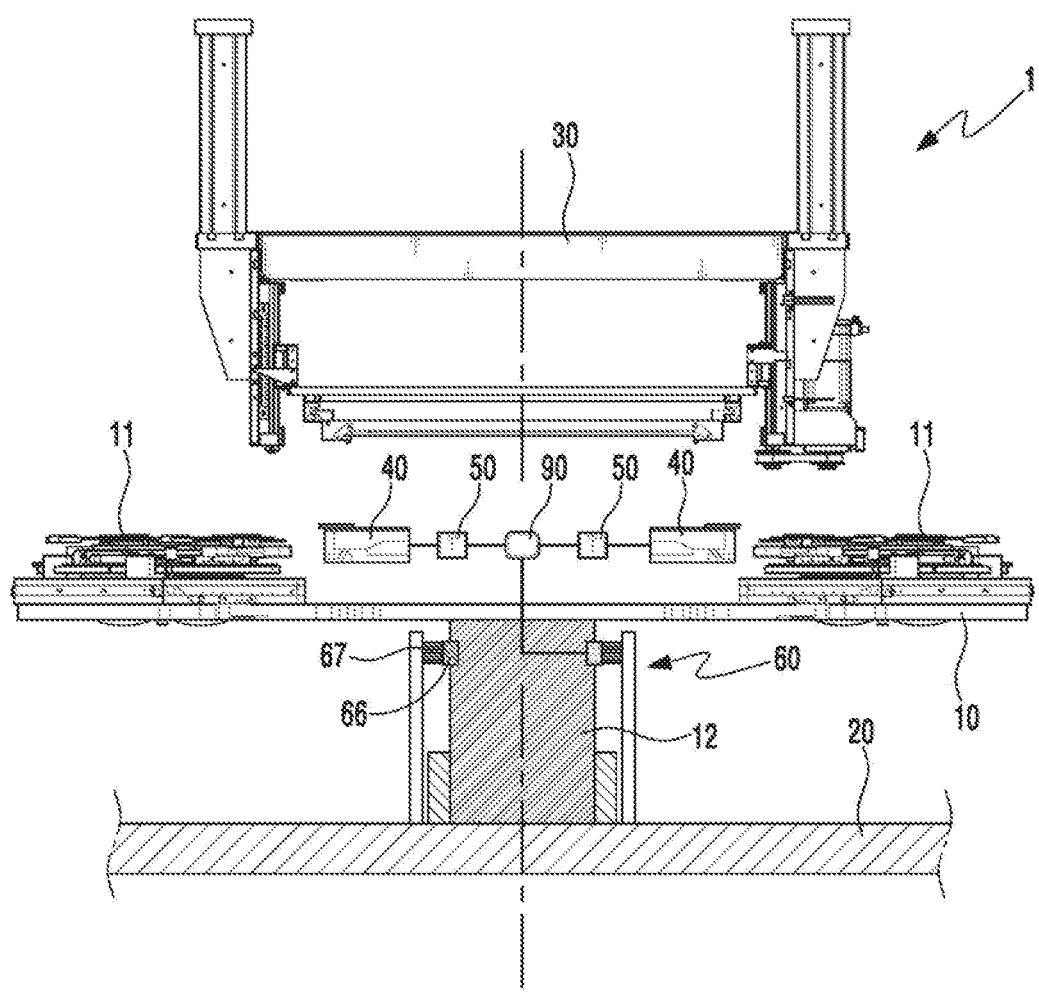
FIG. 7 is a diagram illustrating a case in which the rotating inspector for a camera module according to the present invention includes a plurality of first data processing units.

The rotating inspector for a camera module according to the present invention may include one single first data processing unit 50 and the single first data processing unit collects multiple pieces of inspection data generated from the respective test boards 40 and then produces result data. Alternatively, as illustrated in FIG. 7, the rotating inspector for a camera module according to the present invention may include a plurality of first data processing units, each one of which is provided for each of the test boards 40.

In this case, the inspection data generated from each of the test boards 40 are analyzed by each of the first data processing units 50 allocated for each test board, thereby shortening the time taken to analyze the inspection data.

The plurality of first data processing units 50 are connected to a network hub 90, and the result data generated in the respective first data processing units 50 may be transmitted to the data transmission unit 60 via the network hub 90.

While the present invention has been particularly shown and described with reference to exemplary embodiments thereof, such embodiments should not be deemed to limit the teaching of this disclosure to those embodiments. It will be understood by those of ordinary skill in the art that various changes and modifications may be made without departing from the spirit and scope of the present invention as defined by the following claims.

EXPLANATION OF REFERENCE NUMERALS

| | |
|---|---|
| 1: Rotating inspector for a camera module | |
| 10: Rotary table | 11: Socket unit |
| 20: Support unit | 30: Inspection device |
| 40: Test board | 50: First data processing unit |
| 60: Data transmission unit | 61: Cable |
| 62: Signal converter | 63: Transmitter |
| 64: Receiver | |
| 65: Near field wireless communication device | |
| 66: Slip ring | 67: Brush |
| 70: Second data processing unit | 80: Pneumatic supply unit |
| 81: Pneumatic slip ring | 90: Network hub |

What is claimed is:

1. A rotating inspector for a camera module, the rotating inspector comprising:
    a rotary table having one or more socket units on which the camera module mounted;
    a plurality of inspection devices disposed around the rotary table to inspect the camera module;
    test boards disposed on the rotary table, each of test boards being connected to the one or more socket units, respectively to control the camera module and generate inspection data for the camera module;
    a first data processing unit disposed on the rotary table and analyzing the inspection data to generate result data for possible defects of the camera module;
    a second data processing unit disposed outside the rotary table, the second data processing unit being configured to receive the result data and to sort and store the received data; and
    a data transmission unit transmitting the result data generated in the first data processing unit to the second data processing unit.

2. The rotating inspector of claim 1, wherein the data transmission unit includes a cable for connecting the first data processing unit and the second data processing unit.

3. The rotating inspector of claim 2, wherein the rotary table is configured to be rotated by a predetermined angle and then to be reversely rotated.

4. The rotating inspector of claim 1, wherein the data transmission unit comprises:
    a signal converter disposed on the rotary table and converting the result data into an optical signal;
    a transmitter disposed on the rotary table and transmitting the result data in the form of the optical signal along a centerline of the rotary table; and
    a receiver disposed outside the rotary table and receiving the result data in the form of the optical signal transmitted from the transmitter.

5. The rotating inspector of claim 1, wherein the data transmission unit includes a near field wireless communication device disposed on the rotary table.

6. The rotating inspector of claim 1, wherein the data transmission unit includes a slip ring disposed on the rotary table and a brush disposed outside the rotary table and being contact with the slip ring.

7. The rotating inspector of claim 4, further comprising a pneumatic supply unit supplying a pneumatic pressure for driving the socket units outside the rotary table, wherein the pneumatic supply unit includes a pneumatic slip ring positioned on the centerline of the rotary table.

8. The rotating inspector of claim 5, further comprising a pneumatic supply unit supplying a pneumatic pressure for driving the socket units outside the rotary table, wherein the pneumatic supply unit includes a pneumatic slip ring positioned on the centerline of the rotary table.

9. The rotating inspector of claim 6, further comprising a pneumatic supply unit supplying a pneumatic pressure for driving the socket units outside the rotary table, wherein the pneumatic supply unit includes a pneumatic slip ring positioned on the centerline of the rotary table.

10. The rotating inspector of claim 1, wherein the first data processing unit is provided for each of the test boards, and the first data processing unit is connected to a network hub through which the first data processing unit is connected to the data transmission unit.

\* \* \* \* \*